United States Patent [19]
Contratto

[11] 3,731,255
[45] May 1, 1973

[54] AUTOMATICALLY OPERABLE END CONNECTOR FOR A POWER DISTRIBUTION SYSTEM

[75] Inventor: James Contratto, Livermore, Calif.

[73] Assignee: U.S. Industries, Inc., New York, N.Y.

[22] Filed: June 21, 1971

[21] Appl. No.: 154,782

[52] U.S. Cl. ................................................ 339/21 R
[51] Int. Cl. ................................................ H01r 9/00
[58] Field of Search ........................... 339/14, 20–24

[56] References Cited

UNITED STATES PATENTS

| 2,977,566 | 3/1961 | Neumann et al. | 339/119 |
| 3,605,064 | 9/1971 | Routh et al. | 339/20 |
| 3,089,042 | 5/1963 | Hickey et al. | 307/147 |
| 3,044,035 | 7/1962 | Adams | 339/21 R |

FOREIGN PATENTS OR APPLICATIONS

| 1,173,549 | 12/1969 | Great Britain | 339/22 T |

Primary Examiner—Ernest R. Purser
Assistant Examiner—Robert A. Hafer
Attorney—Joseph B. Gardner

[57] ABSTRACT

An end connector for a power distribution system of the type providing an essentially continuous convenience outlet enabling electric plugs to be connected thereto at substantially any selected location therealong. The system includes one or more elongated track components that provide such convenience outlet, and each such track component is equipped along its length with a conductor assembly comprising a plurality of spaced apart electric conductors insulated one from another. The end connector is connectable with such track component at an end thereof, and may take the form either of a splice box used to join successive track components or of an end closure used to attach an end block or junction box thereto and within which the conductors of the distribution system are connected with power supply lines. The end connector, for the purpose of establishing connection thereof with a track component, has a housing portion insertable into the end of a track component, and the connector is equipped with a plurality of contacts that automatically engage and establish an electric connection with the respective conductors of the track component upon insertion of the housing portion of the end connector thereinto.

11 Claims, 5 Drawing Figures

Patented May 1, 1973
3,731,255
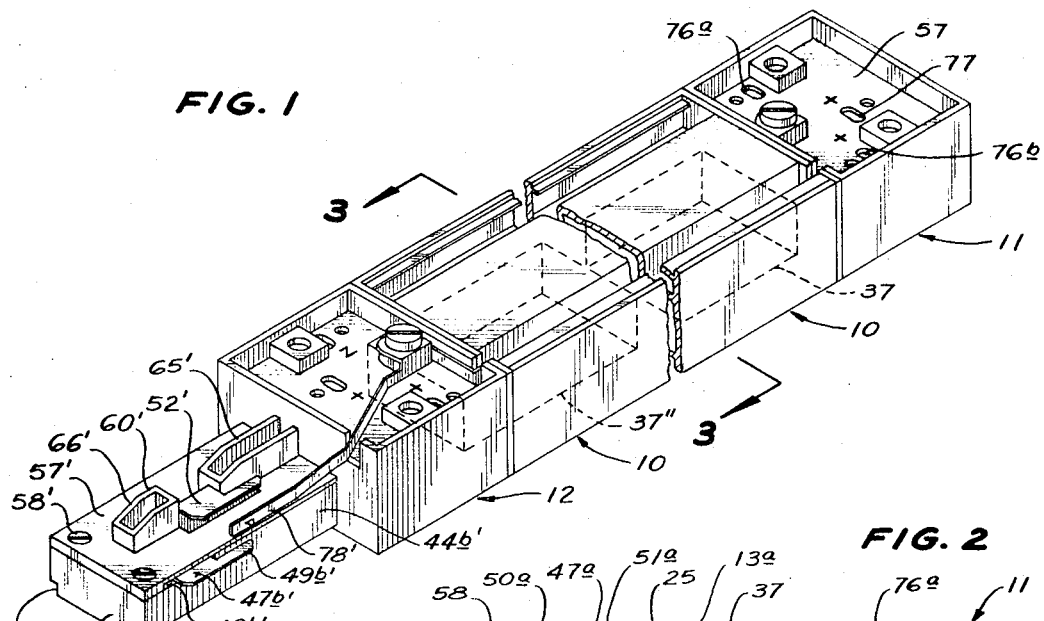
FIG. 1
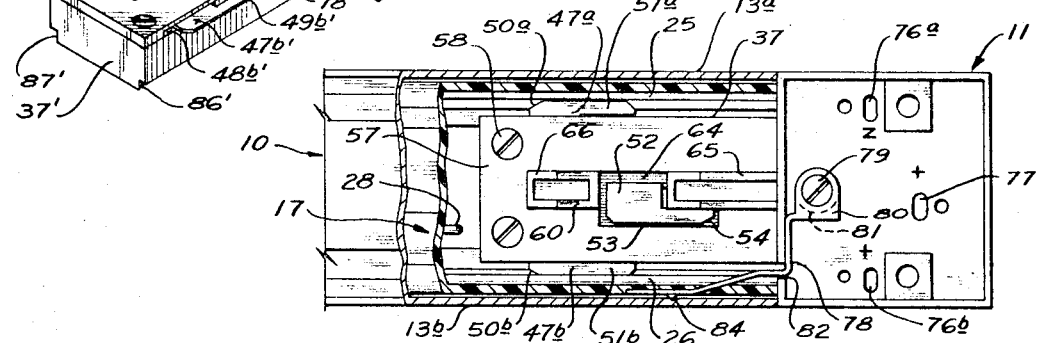
FIG. 2
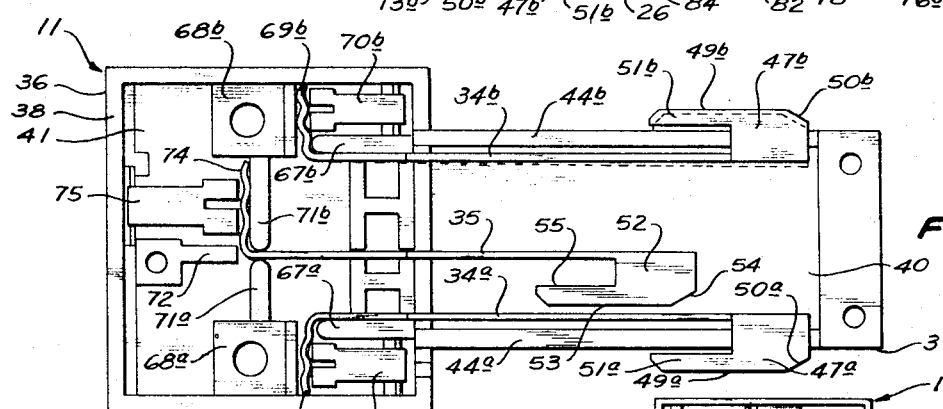
FIG. 4
FIG. 5
FIG. 3
INVENTOR:
JAMES CONTRATTO
BY Joseph B. Gardner
ATTORNEY

AUTOMATICALLY OPERABLE END CONNECTOR FOR A POWER DISTRIBUTION SYSTEM

This invention relates to a power distribution system and, more particularly, to an end connector either in the form of a splice box (or coupler) or of an end closure for a power distribution system having elongated track components provided with substantially continuous receptacles or convenience outlets therealong adapted to have plugs connected thereto at substantially any selected location along the length thereof.

End connectors of the type being considered herein are discussed in terms of their general structure and function in commonly assigned copending patent applications Ser. No. 780,840, filed Dec. 3, 1968 and Ser. No. 19,660, filed Mar. 16, 1970; and as explained in such applications, such end connectors provide a quick and easy means for interconnecting a plurality of successive track components and for closing the terminal end of any one such component while interconnecting the conductors thereof with power supply lines. The end connectors disclosed in such copending patent applications comprise a plurality of contacts that are selectively movable between inner retracted positions and outer extended positions in which they are adapted to engage the respective conductors in the track component of a power distribution system so as to establish an electric connection therewith. Each end connector is equipped with manually operable selector structure which is manipulated once the connector is inserted into a track component so as to displace certain or all of the contacts outwardly into engagement with the respectively associated conductors.

The present invention is concerned with and has for a general object an improved end connector for a power distribution system in which the various contacts of the connector automatically engage and thereby automatically establish electric connection with the various conductors in a track assembly upon insertion of the end connector thereinto, thereby obviating the requirement for selector structure which must be manually manipulated to provide the requisite interconnection.

Additional objects and advantages of the invention, especially as concerns particular features characteristics thereof, will become apparent as the specification continues.

A power distribution system embodying the present invention may include a plurality of elongated, longitudinally extending track components connected by splice boxes or couplers (i.e., one form of the end connector) one with another in a succession thereof. Each track component is relatively rigid and defines a longitudinally extending convenience outlet therealong, and it is intended to be supported along a ceiling or other building wall and, in many cases, is either partially or completely embedded therein. Each receptacle-equipped track component is adapted to have one or more male plugs connected at any suitable location within the convenience outlet, and cooperative polarization means may be provided by the track component and by such plug to permit connection thereof in only one relative orientation. Each end connector, whether a splice box interconnecting successive track components or an end closure located at a terminal end of a succession of track components, is connectable with any particular track component at an end thereof.

In interconnecting two successive track components, a unitary splice box or coupler is used having opposite end portions in respective association with such components and in connecting a succession of track components at one end with power supply lines, a live end closure is used in association with a junction or end box within which the actual physical connection is made to the power supply lines. In the usual instance, the power distribution system will have three spaced apart and electrically isolated conductors extending along the track components, and each end conductor will have three contacts respectively engageable with such conductors automatically upon insertion of the end connector into the track component.

Embodiments of the invention are illustrated in the accompanying drawing, in which:

FIG. 1 is a broken perspective view illustrating both a live end closure and a splice box connected with track components of a power distribution system embodying the present invention;

FIG. 2 is an enlarged, broken top plan view illustrating the live end closure shown in FIG. 1 in association with a track component, portions of which are broken away;

FIG. 3 is a further enlarged transverse sectional view, taken along the line 3—3 of FIG. 1, of a track component and splice box forming a part of the power distribution system;

FIG. 4 is a top plan view of the live end closure shown in FIG. 2 but with the top cover thereof removed and the closure turned end-for-end; and FIG. 5 is a broken top plan view of the splice box with the top cover thereof removed.

The power distribution system partially illustrated in FIG. 1 may include a plurality of interconnected track components 10, only one of which is shown, and they are each receptacle-equipped components adapted to have one or more plugs or adaptors (not shown) connected therewith at various locations therealong. Each such adaptor is usually associated with an electric fixture or appliance such as an incandescent lighting fixture (not shown). The track components 10 are associated with end connectors 11 and 12, the first of which is a live end closure and the second a splice box or coupler.

The track component 10 and end connectors 11 and 12 ( and adaptors, not shown) are polarized so as to cause all of the elements of the power distribution system to have a predetermined orientation, thereby resulting in particular polarities being observed in interconnecting the same. The polarization means employed will be described briefly hereinafter for convenience, and is illustrated and described in detail in the aforementioned application Ser. No. 19,660. At this point, however, it may be observed that apart from such polarization means the track component 10 is generally symmetrical about a vertical center line therethrough; and in view of such general symmetry, the same numerals are employed to identify the oppositely positioned counterpart elements except that the suffixes "a" and "b" are added for purposes of differentiation therebetween.

Accordingly, and referring to FIGS. 2 and 3 in particular, the track component 10 is seen to include a pair of longitudinally extending and transversely spaced side walls 13a and 13b formed integrally with a longitudinally extending web 14 that is transversely disposed and projects between the side walls intermediate the top and bottom thereof.

Adjacent their upper ends, the side walls 13 are turned inwardly to define flanges 15a and 15b that are used in securing the track component 10 to a ceiling or other support means, not shown. The track component 10 is intended to be assembled in succession with other like track components in a predetermined orientation so that circuit continuities are observed and maintained throughout an entire distribution system.

The track component 10 is provided with a chamber or receptacle 16 in underlying relation with the web 14, and such receptacle or chamber defines a longitudinally extending convenience outlet adapted to receive one or more adaptors therein. The chamber 16 adjacent its upper end in underlying relation with the web 14 is provided with a conductor assembly denoted in general with the numeral 17. The conductor assembly 17 includes an elongated insulator or insulated holder 18 having a web 20 of substantially the same general configuration as that of the track web 14 so as to be able to closely underlie the same, as illustrated in FIG. 3. Therefore, the web 20 is also provided with downwardly inclined segments 21a and 21b respectively corresponding to the downwardly and outwardly inclined segments 22a and 22b of the track web 14.

The insulator 18 is provided adjacent the lower outer ends of the inclined sections 21a and 21b with longitudinally extending channel- or slot-forming sockets 24a and 24b respectively having conductors 25 and 26 mounted therein. Adjacent the upper end of the inclined section 21a at its mergence with the horizontal web section another longitudinally extending channel- or slot-forming socket 27 is provided and has a conductor 28 mounted therein. Each of the conductor-equipped sockets 24 and 27 is provided with a restricted mouth confining the associated conductor therein and adapted to pass therethrough one of the contacts of an adaptor or of the end connectors 11 and 12, as will be explained hereinafter. The conductors 25, 26, and 28 may be conventional copper wires (12 gauge, for example), and they are effectively constrained against longitudinal displacements with respect to the insulator 18 by the frictional grip of the respective sockets within which they are confined, thereby eliminating the use of collars crimped about the conductors as explained in the aforementioned U.S. Pat. No. 3,529,275.

The insulator 18 is sufficiently rigid to be substantially self-sustaining and maintain the conductors in the spaced apart relationship shown and to confine the same within the slots or channels therefor. The insulator 18 is also equipped with depending legs 30a and 30b respectively extending downwardly from the channel members 24a and 24b, and such legs are substantially parallel to the side walls 13a and 13b of the track 10. Each leg 30 together with the associated slot portion or socket 24 has a vertical dimension slightly less than the distance between the horizontally oriented shoulders 31a and 31b respectively connecting the inclined sections 22a and 22b of the track web 14 with the side walls 13a and 13b and the respectively underlying inwardly turned flanges 32a and 32b that extend inwardly from the side walls 13a and 13b and are substantially parallel with the respectively facing shoulders 31a and 31b. The legs 30 generally maintain the conductor assembly 17 in the position or orientation shown but in the absence of an adaptor or end connector 11 or 12, the conductor assembly is free to move downwardly relative to the track 10 until the lower extremities of the legs 30 abut the inwardly turned flanges 32. Such relative dimensions of the legs 30 and spacing between the shoulders 31 and flanges 32 enables the conductor assembly 17 to fit rather loosely within the chamber 16 so that it is freely movable with respect thereto in longitudinal directions, thereby facilitating incorporation of the conductor assembly 17 within the track 10.

The conductor assembly 17 provides a plurality of circuits or pairs of conductors defining the same, and in the particular distribution system being considered there are two such circuits and, therefore, two pairs of conductors defining the same. In more particular terms, the conductor 25 is common to each of the two circuits and conductor pairs and may be considered the neutral conductor. The conductors 26 and 28 are selectively associated with the neutral conductor 25, and the adaptor used in the system is adapted to be selectively connected to one or the other of such circuits, as explained in the commonly assigned copending patent application of Larry L. Routh and James Contratto entitled "Adaptor For a Power Distribution System", Ser. No. 880,335, filed Nov. 26, 1969. As is well known, in the usual distribution system the potential defined between the neutral conductor 25 and either of the conductors 26 and 28 is of the order of 110 volts AC, and the potential across the conductors 26 and 28 (which potential is not ordinarily used) is of the order of 220 volts AC.

As suggested heretofore, for the purpose of enabling the receptacle-equipped track components to be readily accommodated by rooms and installations irrespective of the dimensional restrictions thereof, it is practicably necessary for such track components to be cut to length at the site of their installation, thereby requiring splice boxes and connector arrangements having no special structural characteristics associated with the track components which might be lost upon cutting the same to custom or special lengths. The end connectors 11 and 12 are so connectable with the receptacle-equipped track components 10 irrespective of their being cut to any particular lengths; and it may be noted that the connectors 11 and 12 are very similar with the connector 12 being essentially a double-ended connector 11.

Accordingly, the primed form of the same numerals used to identify the elements of the splice box 11 are used where appropriate to identify the respectively corresponding elements of the end closure 12.

The end closure 11 is not intended to have plugs, adaptors or other utilization devices connected therewith, and, accordingly, does not have an elongated receptacle for this purpose provided along the underside thereof. Generally, the closure 11 is intended to establish connection therethrough between a track component and connector block or junction box, and, therefore, includes a plurality of contacts to establish connection with the respective conductors of the track component 10. In positive terms, the closure 11 is provided with a pair of contacts 34a and 34b that respectively engage the conductors 25 and 26 of the track components 10, and with a third or additional contact 35 which engages the conductor 28 of such track component.

The contacts 34 and 35 are mounted within a housing or casing 36 having a forwardly extending section 37 insertable into the chamber 16 of the track component 10 (as shown in FIGS. 1 and 2). The housing 36 is also provided with a rear end portion 38 enlarged both transversely and vertically with respect to the section 37, and it is abuttable with the end of the track component 10 upon such insertion of the housing section 37 thereinto, also as shown in FIGS. 1 and 2. The housing is provided therein with a contact compartment 40 and with a connector compartment generally denoted 41.

Each of the contacts 34 and 35 is elongated longitudinally with the contacts 34a and 34b being of substantially the same length and disposed in transversely spaced, substantially parallel alignment, as is most evident in FIG. 4. Each of the contacts 34 extends forwardly from the connector compartment 41 and seats within a channel provided therefor that is defined between the housing side wall 41a and an upwardly extending boss or wall structure 45a adjacent thereto in the case of the contact 34a, and between the housing wall 44b and adjacent boss or wall structure 45b in the case of the contact 34b. Such recesses respectively confine the contacts 34 therein, and it may be observed in FIG. 4 that the contacts extend forwardly into the compartment 40 in substantially parallel relation and in substantially parallel relation with the side walls 44 of the housing.

At their forward ends, the contacts 34 are respectively provided with outwardly turned terminal ends 47a and 47b that project through openings 48a and 48b defined in the respective side walls 44. The contacts 47 have outer edges 49 that are adapted to frictionally engage the conductors 25 and 26 to establish an electric connection therewith, and such edges have inclined cam portions 50 to facilitate insertion of the closure into the track housing 10. The outwardly turned end portion 47 of the contacts further extend rearwardly along the respectively associated side walls 44 so as to parallel the same, and for identification such rearwardly extending portions are denoted with the numerals 51a and 51b. Ordinarily, the end portions 51 are spaced from the housing walls 44, as shown in FIG. 4, but are displaceable inwardly into substantial abutment with the side walls, as shown by broken lines in association with the contact 34b in FIG. 4, when the closure is inserted into the track 10, as is clearly evident in FIG. 2.

In an analogous manner, the contact 35 has an end portion 52 that is turned laterally and is provided with an outer edge 53 adapted to frictionally engage the conductor 28. The edge 53 has a cam portion 54 and a rearwardly extending portion 55 serving the same function as the portions 51 associated with the contacts 34. In the particular embodiment of the invention being considered, the end portion 52 of the central contact 35 is turned in the same direction as the end portion 47a of the contact 34a, and the end portions 51a and 55 are disposed in the same orientation for inward displacement toward the remote housing wall 44b. All of the contacts have sufficient resilience to be self-biased toward the outwardly projecting positions shown, and may be made of a material such as relatively hard brass which has such inherent resilience.

The closure 11 is equipped with a cover plate 57 that is removably secured to the casing 38 by a plurality of screws 58. The cover plate 57 substantially encloses each of the compartments 40 and 41, and the contacts 34 tend to be isolated from each other adjacent the outwardly turned terminal ends 47 thereof by a rib 60 that extends upwardly from the cover plate along the center thereof. Adjacent the rib 60 and inwardly thereof, the cover 57 is provided with a transversely elongated opening 64 through which the upwardly extending portion and terminal end 52 of the contact 35 extend. Rearwardly of the opening 64 is an additional upwardly extending rib 65 oriented in axial alignment with the rib 60, each of which is at the center of the cover 57. The ribs 60 and 65 both serve to urge the conductor assembly 17 upwardly relative to the metal track so as to force the two webs 20 and 14 into substantially contiguous relation, as shown in FIG. 3 respecting the splice box 12. The leading edge 66 of the rib 60 is inclined so as to facilitate insertion of the end closure 11 into the track component 10 and force the conductor assembly 17 upwardly to establish an accurate condition of alignment between the respective terminal ends 47 and 52 and the slots in the conductor carriers 24 and 27.

It will be observed in FIG. 4 that the contacts 34a and 34b are turned laterally within the connector compartment 41 at the respective ends of longitudinally extending wall segments 67a and 67b, and are disposed along connector posts 68a and 68b which have threaded openings therein to permit the end closure 11 to be fixedly secured to a junction box (not shown). The laterally turned end portions of the contacts 34 are formed so as to have a somewhat corrugated configuration, as shown at 69a and 69b, so as to seat a generally cylinderical power supply line or lead wire therein, and spring clips 70a and 70b which have resilient spring legs in substantial alignment with respectively associated corrugations cooperate therewith in locking such lead wires into mechanical and electrical engagement with the contacts 34. A similar arrangement is provided for the contact 35 which is turned laterally adjacent a plurality of wall segments 71a, 71b, and 72, and is corrugated as shown at 74 so as to cooperate with a spring clip 75 in anchoring a lead wire in connection therewith.

Referring to FIG. 2, it will be observed that the cover 57 is provided with openings 76a and 76b respectively aligned with the laterally turned end portions 69a and 69b of the contacts 34 so as to permit the ends of lead wires to be inserted downwardly through the cover 57 and into engagement with the contacts so as to be held thereagainst by the spring clips 70. Similarly, the cover 57 is also provided with an opening 77 in alignment with a laterally turned end 74 of the contact 35 so as to permit lead wires to be connected thereto. For convenience, the upper surface of the cover 57 is marked with the polarity so as to facilitate interconnection of a distribution system with the power supply lines. In this respect, the openings 76b and 77 are both marked for positive polarity, and the opening 76a is marked for connection to the neutral or line common to the two circuits respectively including the contacts 34a and 35.

It may also be seen in FIG. 2 that a ground contact 78 is fixedly secured to the cover 57 by means of a cap screw 79 extending through a laterally turned connector ear 80 forming a part of the contact 78, and which screw 79 is received within the threaded opening of an upwardly extending boss 81 provided by the cover 57. The ground contact or wire 78 extends forwardly through a slot 82 provided therefor in a vertical wall of the casing or housing section 36 so that the outer free end of the ground contact extends generally along the forwardly projecting end portion 37 of the end closure 11. The ground contact 78 is a resilient component that is biased outwardly because of its inherent resilience, and it may be provided with a barb 84 enabling it to scrap or gouge the inner surface of the metal component 10 so as to establish a good electric connection therewith.

In this respect, the metal track forming a part of the track component 10 is adapted to be used as the ground conductor for the entire distribution system so that interconnection of the successive track components via the ground contacts 78 of the splice boxes 12 is necessary. The system itself can be grounded to the power distribution system by appropriate connection of the ground wire thereof to the track components, as by means of the screw 79 at the end closure 11. It might be noted, however, that in certain instances use of the metal track as the ground for the system may not be desired, and in this event a single electric circuit could be provided such as across the conductors 25 and 26 with a conductor 28 serving as a ground for the two-wire distribution system.

Inspection of FIG. 3 makes it evident that the conductors 25, 26, and 28 extending each track component 10 have a predetermined orientation with respect to each other, and since the conductors are not symmetrically disposed (the conductor 28 being offset from the center of the track component in one direction), right-hand and left-hand end closures 11 must be provided in order that any particular track component can be selectively connected at either end thereof to a power distribution system. The right-hand and left-hand end closures 11 may be substantially the same except that the casing or housing 36 and particularly the end portion 37 thereof must be changed slightly to permit insertion thereof into a track component 10 from the opposite direction, and the contact 35 must have the end portion 52 thereof turned in the opposite lateral direction so that the edge 53 thereof can engage the conductor 28.

As respects the changes required in the casing or housing 36, it will observed by referring to FIG. 3 that the track component 10 is polarized so that the end connectors 11 and 12 can be inserted thereinto in only one predetermined orientation with respect thereto. More particularly, the inwardly extending flange 32a of the track component 10 is provided along the inner edge thereof with an upwardly extending rib or lip 85 but the corresponding flange 32b is without such rib, thereby making the track component asymmetrical about a center plane therethrough. Evidently then, each of the end connectors 11 and 12 must be configurated along the forwardly extending end 37 thereof so as to accommodate the polarizing rib 85, and such configuration is most evident in FIG. 3 which shows that the end connector 12 is provided along each of the bottom edges thereof with channels or recesses 86 and 87 the latter of which is sufficiently large in a vertical direction so as to accommodate the polarizing rib 85. Thus, depending upon the direction from which an end closure 11 is to be inserted into the track component 10, one or the other of the longitudinal edges of the forward projection 37 will have the larger channel or recess 87 so as to receive the polarizing rib 85.

As respects the requisite orientation of the terminal end 52 of the center contact 35, the opening 64 in the cover 57 may be sufficiently wide so as to accommodate either orientation of the contact 35. However, if the cover 57 is marked so as to indicate the positive and neutral apertures 76 and 77, the markings associated with the apertures 76 would have to be reversed from that shown in FIG. 2 in the case of an end closure 11 adapted to enter the opposite end of the track component 10.

End connectors in the form of splice boxes or couplers 12 are essentially the same as the end closures 11 except that they have an additional outwardly projecting end portion so as to cooperate with two successive track components 10 and join or interconnect the same. This identity of the two different types of end connectors is most apparent by comparing the external appearances of the two connectors, as shown in FIGS. 1 and 4, and by comparing the internal characteristics thereof as indicated best in FIGS. 4 and 5. The essential difference is that the various contacts are integers respectively extending from one end portion of the splice box to the other end portion thereof with laterally turned segments within the central connector compartment to enable supply lines to be connected thereto or to permit other track components to be electrically connected therewith should either position be desired. As indicated hereinbefore, because of the similarity both functionally and structurally between the two types of end connectors 11 and 12, the same numerals are applied to the splice box 12 to designate the parts thereof respectively corresponding to those in the end closure 11 except that the prime form of the numerals are used, and for purposes of differentiation between the right-hand and left-hand ends of the splice box 12 both single and double primed numerals are employed. Further description reciting such numerals is not required for an understanding of the present invention, however, and will be omitted.

It is evident from all of the foregoing that the end connectors 11 and 12 cooperate with track components 10 simply by inserting the end portions 37 of the appropriate connectors into the track components because such insertion automatically engages the respective contacts 34 and 35 with the appropriate conductors 25, 26, and 28. MOre particularly in this respect, each of the contacts 34 and 35 is resiliently biased toward the outwardly displaced positions thereof illustrated in FIG. 4 so that they are forced to engage the respective conductors upon insertion of the connector end portion 37 into the track component. Engagement of the contacts with the conductors first occurs adjacent the leading end portions of the laterally turned contact ends 47 and 52 and especially along the inclined cam portions 50 and 54 thereof. Therefore, as the connector is progressively inserted into the track component, the sliding engagement of the contact end portions with the conductors urges each contact end portion inwardly toward the abutment associated therewith.

Accordingly, the leading or longer outer contacts 34a and 34b first engage the conductors 25 and 26 and are cammed or urged progressive inwardly until the rearwardly extending end portions 51a and 51b of such contacts abut the stop surfaces defined by the housing walls 44a and 44b. Upon such abuttable engagement of the components 51 with the walls 44, the contact edge portions 49a and 49b frictionally engage the respectively associated conductors 25 and 26 to establish a good electrical connection therewith. In this respect, the edge portions 49 may scrape along and dig into the relatively soft (usually copper) conductors which may be slightly displaceable outwardly within the fixed limits defined by the rigid side walls 13 of the track component 10. Evidently, the dimensional relationships are imposed such that when the contacts 25 and 26 have been displaced outwardly to the maximum permissible extent, the contact end portions 51 are in rigid abutment with the housing walls 44 and, at the same time, the edges 49 of the contact end portions are in tight frictional engagement with the conductors.

The contact 35 establishes an electric connection with the conductor 28 in the same manner, and because it engages such conductor after engagement of the contact 34 with the conductors 25 and 26 has been commenced, initial insertion of the connector end portion 37 into the track component is facilitated. The trailing or rearwardly extending end portion 55 of the laterally turned end 52 of the center contact 35 terminates inward movement of the contact upon cooperative engagement thereof with the conductor 28 by abutment with the upwardly extending rib 65, as shown in FIG. 2. Upon each insertion of a connector end portion 37 into a track component, each of the contacts 34 and 35 electrically engages the conductors 25, 26, and 28 respectively aligned therewith so that such conductors of adjacent or successive track components 10 are always interconnected via a splice box or coupler 12 interposed therebetween, and are always connected with the three lead wires associated with any live end closure 11. Thus, there is no need for a workman to concern himself with which circuits should be connected to any particular connector 11 or 12.

In this same reference, the track components 10 and end connectors 11 and 12 are polarized, so that there is no way to improperly interconnect the same since the larger channel or recess 87 must be aligned with the polarizing rib 45 before an end portion 37 of the connector can be inserted into the channel component. Thus, proper polarity is maintained throughout the entire distribution system. It may be noted that the adaptors (not shown, but disclosed in the aforementioned patent application Ser. No. 880,335) used to connect lighting fixtures and other appliances to the distribution system are also polarized so that each such appliance when connected to the system is necessarily connected so that proper polarity is preserved.

As each end connector 11 and 12 is inserted into a track component 10, the conductor assembly 17 which is loosely supported within the track is cammed upwardly by the ribs 60 and 65 of the connector so as to accurately align the openings or mouths in the conductors holders or sockets 24 and 27 with the contact end portions 47 and 52 so that no difficulty is experienced in effecting the electric connection between the conductors 25, 26, and 27 and the respectively associated contacts 34 and 35.

The openings or apertures 76 and 77 in the covers 57 of the end connectors are sufficiently large to receive two lead wires should this be desired, and the laterally turned portions of the contacts have two recesses or corrugations respectively cooperative with the spring means or the spring clips 70 and 75 so as to accept and connect any such two lead wires with the contacts. Further, the end connectors are useful with track components 10 at the ends thereof without the requirement for special structural provision thereat so that the track components can be cut to any necessary or desirable length to accommodate the requirements of a particular installation. Accordingly, it is only necessary to cut a track component to the length desired, and then insert the end portion 37 of the connector into the track component which automatically establishes the necessary electric connections. The housing 36 and cover 57 may be formed of any suitable insulating material and may be fabricated of various materials have dielectric characteristics such as one of the synthetic plastic materials, a polycarbonate for example. The track component, except for the conductor assembly thereof, may be metal, extruded aluminum for example.

The end connectors 11 and 12 may be used repeatedly to interconnect various track components 10 or to close an end thereof. However, in the usual case the end connectors are used only once because any particular installation employing such connector or connectors together with one or more track components is intended to be permanent. Accordingly, any wear that may occur along the outer edges 49 and 53 of the contacts is of no significance in the usual instance, but any such wear is so minimal that it cannot impede repeated uses of the connectors, should this be desired.

It will be apparent that the walls 44 of the housing or casing an rib 65 define stop structure cooperative with the respectively associated contacts to limit inward displacements thereof and, as a consequence, define the maximum permissible inward movement of each such contact. As respects the contacts 34, the housing walls 44 also define the maximum permissible outward movement of the contacts and also, therefore, serve as stop structure as respects such contacts and the resilient biasing forces tending to displace the same outwardly. As previously explained, the rearwardly extending portions 51 and 55 of the respective contacts defines abutment structure engageable with the housing walls 44 or rib 65, as the case may be. As concerns the contact 35, however, the rib 65 serves only as stop structure establishing the maximum permissible inward displacement of the contact, whereas the edge of the opening 64 in the top wall or cover 57 of the connector serves as the stop structure restricting outward displacement of the contact under the inherent resilient biasing force urging the contact in such direction.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. An end connector or the like for use in a power distribution system having a track component provided with a longitudinally extending chamber therealong equipped with a conductor assembly that includes a plurality of conductors insolated one from the others, comprising a casing having a section thereof insertable into such chamber, a contact mounted within said casing and movable transversely with respect thereto between an inner conductor-engaging position and an outer position transversely displaced therefrom and being biased toward the outer position thereof, and stop structure provided by said casing for abutment by said contact upon inward movement thereof to define the maximum permissible inner position of said contact, said contact being automatically engageable with one such conductor upon insertion of said casing section into such chamber to establish an electric connection therebetween and being displaced into such maximum inner position and positively constrained therein against said stop structure by such one conductor upon complete insertion of said casing section, whereby such engagement of said contact with the aforesaid one conductor deforms at least one thereof as a result of the transverse constraint against displacement imposed on said contact by said stop structure.

2. The end connector of claim 1 in which said casing is provided with a longitudinally disposed wall having an opening therein through which said contact projects, said contact being movable relative to said wall between said inner and outer positions and having an abutment portion extending along said wall on the exterior thereof, said wall defining the aforesaid stop structure and said abutment portion of said contact being abuttable therewith as aforesaid to establish the maximum permissible inner position.

3. The end connector of claim 1 in which a plurality of said contacts are mounted within said casing and each being movable transversely with respect thereto between inner conductor-engaging and outer positions and being biased toward the outer positions thereof, in which a plurality of stop structures as aforesaid are provided by said casing in respective association with said contacts for abutment thereby to define the maximum permissible inward position of each, said casing being provided with a plurality of longitudinally disposed walls respectively associated with said contacts and each having an opening therein through which the associated contact projects, each of said contacts being movable relative to its associated wall between said inner and outer positions.

4. The end connector of claim 3 in which each of said contacts is an elongated longitudinally extending component having an end portion projecting through the associated wall opening, each of said contacts being characterized by an inherent spring-like resilience effecting the aforesaid biasing thereof toward its outer position, and in which at least certain of said contacts have an abutment portion extending along the associated casing wall on the exterior thereof, the casing walls associated with said certain contacts defining the aforesaid stop structures therefor and said abutment portions of such certain contacts being abuttable therewith as aforesaid to establish such maximum permissible inner positions.

5. An end connector or the like for use in a power distribution system having a track component provided with a longitudinally extending chamber therealong equipped with a conductor assembly that includes a plurality of conductors insolated one from the others, comprising a casing having a section thereof insertable into such chamber, a plurality of contacts mounted within said casing and each being movable transversely with respect thereto between inner and outer positions and being biased toward the outer position thereof, a plurality of stop structures provided by said casing for respective abutment by said contacts upon inward movements thereof to define the maximum permissible inner position of each contact, each of said contacts being automatically engageable with one such conductor upon insertion of said casing section into such chamber to establish an electric connection therebetween, and polarization means carried by said casing and cooperative with such track component to positively determine the permissible interconnections of said end connector with such track component so as to preserve predetermined polarities throughout a power distribution system, said casing being provided with a plurality of longitudinally disposed walls respectively associated with said contacts and each having an opening therein through which the associated contact projects, each of said contacts being movable relative to its associated wall between said inner and outer positions and being an elongated longitudinally extending component having an end portion projecting through the associated wall opening, each of said contacts being characterized by an inherent spring-like resilience effecting the aforesaid biasing thereof toward its outer position, said casing section being equipped with a top wall defining one of the aforesaid longitudinally extending walls having an opening therein and one of said contacts projecting through such opening, said upwardly extending rib defining one of the aforesaid stop structures and the abutment portion of the contact associated therewith being abuttable thereagainst as aforesaid.

6. The end connector of claim 5 in which said upwardly extending rib has an inclined leading edge engageable with a conductor assembly provided by such track component so as to enforce a predetermined positional relationship upon such conductor assembly relative to said end connector and thereby facilitate connection of said contacts with the respective conductors of such conductor assembly.

7. The end connector of claim 5 defining a splice box adapted to couple a pair of successive track components, said casing having a pair of the aforesaid sections oriented in opposite directions and being respectively insertable into the chambers provided by successive track components, each of said contacts extending from end-to-end of said splice box and being provided with an end portion in each casing section independently movable as aforesaid between inner and outer positions.

8. An end connector or the like for use in a power distribution system having a track component provided with a longitudinally extending chamber therealong equipped with a conductor assembly that includes a plurality of conductors insolated one from the others, comprising a casing having a section thereof insertable into such chamber, a plurality of contacts mounted within said casing and each being movable transversely with respect thereto between inner and outer positions and being biased toward the outer position thereof, and a plurality of stop structures provided by said casing for respective abutment by said contacts upon inward movements thereof to define the maximum permissible inner position of each contact, each of said contacts being automatically engageable with one such conductor upon insertion of said casing section into such chamber to establish an electric connection therebetween, said casing being provided with a plurality of longitudinally disposed walls respectively associated with said contacts and each having an opening therein through which the associated contact projects, each of said contacts being movable relative to said wall between said inner and outer positions, said casing section being equipped with a top wall having an upwardly extending rib located therealong, said top wall defining one of the aforesaid longitudinally extending walls having an opening therein and one of said contacts projecting through such opening, said upwardly extending rib defining one of the aforesaid stop structures and the abutment portion of the contact associated therewith being abuttable thereagainst as aforesaid.

9. The end connector of claim 8 in which at least certain of said contacts have an abutment portion extending along the associated casing wall on the exterior thereof, the casing walls associated with said certain contacts defining the aforesaid stop structures therefor and said abutment portions of such certain contacts being abuttable therewith as aforesaid.

10. The end connector of claim 8 in which said upwardly extending rib has an inclined leading edge engageable with a conductor assembly provided by such track component so as to enforce a predetermined positional relationship upon such conductor assembly relative to said end connector and thereby facilitate connection of said contacts with the respective conductors of such conductor assembly.

11. The end connector of claim 8 in which each of said contacts is an elongated longitudinally extending component having an end portion projecting through the associated wall opening, each of said contacts being characterized by an inherent spring-like resilience effecting the aforesaid biasing thereof toward its outer position.

* * * * *